US012160294B2

(12) United States Patent
Chandrasekar et al.

(10) Patent No.: US 12,160,294 B2
(45) Date of Patent: Dec. 3, 2024

(54) ASYMMETRIC COORDINATED BEAMFORMING

(71) Applicant: QUALCOMM Incorporated, San Diego, CA (US)

(72) Inventors: Manikandan Chandrasekar, Bangalore (IN); Devangam Kotha Kirankumar, Bengaluru (IN); Raj Kumar Krishna Kumar, Bangalore (IN); Rohit Kapoor, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 236 days.

(21) Appl. No.: 18/050,847

(22) Filed: Oct. 28, 2022

(65) Prior Publication Data

US 2024/0146370 A1    May 2, 2024

(51) Int. Cl.
| | |
|---|---|
| *H04B 7/06* | (2006.01) |
| *H04B 7/024* | (2017.01) |
| *H04W 72/20* | (2023.01) |
| *H04W 74/0816* | (2024.01) |

(52) U.S. Cl.
CPC .......... *H04B 7/0617* (2013.01); *H04B 7/024* (2013.01); *H04W 72/20* (2023.01); *H04W 74/0816* (2013.01)

(58) Field of Classification Search
CPC ..... H04B 7/0617; H04B 7/024; H04W 72/20; H04W 74/0816
See application file for complete search history.

(56) References Cited

U.S. PATENT DOCUMENTS

| | | | |
|---|---|---|---|
| 2018/0007703 A1* | 1/2018 | Pajona | H04W 72/543 |
| 2019/0036583 A1 | 1/2019 | Cherian et al. | |
| 2019/0081664 A1* | 3/2019 | Vermani | H04L 5/0035 |
| 2020/0280345 A1* | 9/2020 | Schelstraete | H04B 7/024 |
| 2021/0120565 A1* | 4/2021 | Kogure | H04W 72/20 |

OTHER PUBLICATIONS

Irmer R, et al., "Coordinated Multipoint: Concepts, Performance and Field Trials," IEEE Communications Magazine, Feb. 2011, pp. 102-111.
Liu J., et al., "Discussions on Multi-AP Coordination", IEEE 802.11-18/1509r0, Sep. 2018, pp. 1-7.
Vermani S, et al., "Terminology for AP Coordination", IEEE 802.11-18/1926r, Nov. 14, 2018, pp. 1-10.
International Search Report and Written Opinion—PCT/US2023/075325—ISA/EPO—Feb. 8, 2024.

* cited by examiner

*Primary Examiner* — Sung S Ahn
(74) *Attorney, Agent, or Firm* — Patterson+ Sheridan, L.L.P.

(57) ABSTRACT

Certain aspects of the present disclosure provide techniques for handling coordinated beamforming in wireless communications systems. An example method performed by a first access point (AP) generally includes outputting, for transmission to a second AP, at least one of a first indication that the first AP supports spatial reuse of transmission resources or a second indication that the first AP supports asymmetric coordinated beamforming (CBF); and outputting, for transmission, signaling to one or more stations (STAs) supported by the first AP without intent to form nulls directed toward other STAs supported by the second AP.

26 Claims, 10 Drawing Sheets

ASYMMETRIC COORDINATED BEAMFORMING

BACKGROUND

Field of the Disclosure

Certain aspects of the present disclosure generally relate to wireless communications and, more particularly, to techniques for handling coordinated beamforming in wireless communication systems.

Description of Related Art

Wireless communications networks are widely deployed to provide various communications services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth requirements that are demanded for wireless communications systems, different schemes are being developed to allow multiple user terminals to communicate with a single access point by sharing the channel resources while achieving high data throughputs. Multiple Input Multiple Output (MIMO) technology represents one such approach that has emerged as a popular technique for communications systems. MIMO technology has been adopted in several wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (such as tens of meters to a few hundred meters).

SUMMARY

One innovative aspect of the subject matter described in this disclosure provides a method for wireless communication at a first access point (AP). The method includes outputting, for transmission to a second AP, at least one of a first indication that the first AP supports spatial reuse of transmission resources or a second indication that the first AP supports asymmetric coordinated beamforming (CBF); and outputting, for transmission, signaling to one or more stations (STAs) supported by the first AP without intent to form nulls directed toward other STAs supported by the second AP.

Another innovative aspect of the subject matter described in this disclosure provides a method for wireless communication at a second AP. The method includes obtaining, from a first AP, an indication that the second AP is selected to participate in asymmetric CBF with the first AP; and participating in asymmetric CBF with the first AP after obtaining the indication.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
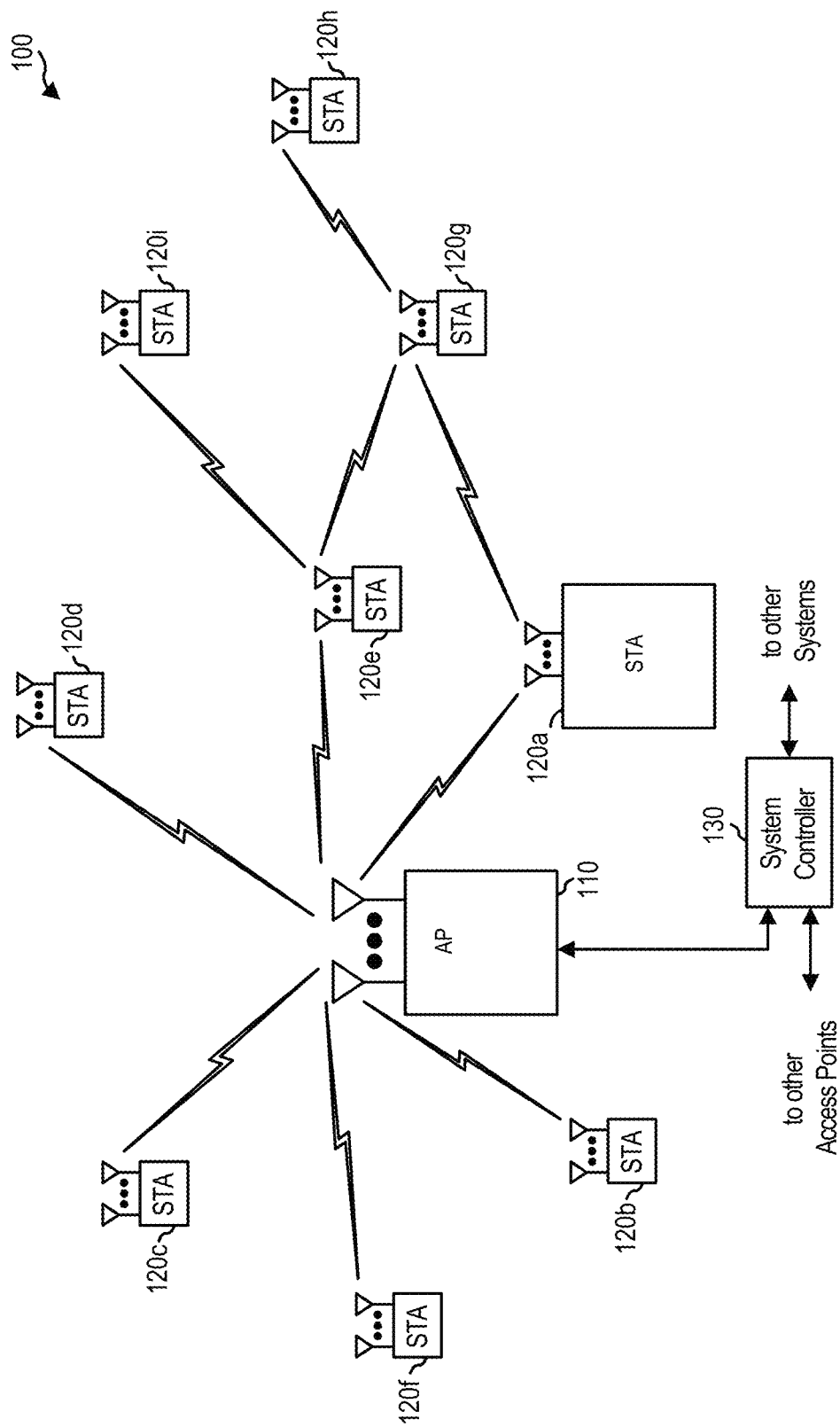
FIG. 1 depicts an example wireless communications network.

Aspects of the present disclosure provide apparatus, methods, processing systems, and computer readable mediums for handling coordinated beamforming in wireless communications systems.

In typical wireless communications systems utilizing spatial reuse of transmission resources, multiple access points (APs) may cooperate in transmitting beamformed signals to stations (STAs). In joint transmission (TX), multiple APs coordinate their transmissions to transmit a signal to one or more STAs. In coordinated beamforming (CBF), simultaneous transmission is allowed across neighboring APs. The APs employ physical layer (PHY) nulling techniques to mitigate interference to neighboring basic service set (BSS) transmissions caused by their own transmissions. In typical CBF techniques, operations may be considered "symmetric," wherein both BSS and overlapping basic service set (OBSS) devices (e.g., APs) null-out interference caused in their neighboring BSS. The process of nulling-out the interference reduces the total power that a device may use for transmitting a desired signal. In addition, nulling-out the interference can use antennas of the device, reducing the number of streams of data the device can transmit.

The present disclosure provides techniques for "asymmetric" CBF, wherein a BSS that wins a transmission opportunity (TxOP) does not resort to nulling to mitigate interference to an OBSS, but the OBSS can share the TxOP by transmitting its own signals, as long as the OBSS creates a null towards the BSS when sharing (e.g., transmitting during) the TxOP. The asymmetric CBF may be considered similar to an enhanced form of spatial reuse (SR), wherein an OBSS may reuse transmission resources used by a BSS. In such cases, the OBSS may not need to inform the BSS of the transmissions scheduled by the OBSS, so long as the OBSS forms nulls toward the BSS clients.

By enabling an OBSS to share a TxOP without the TxOP-winning BSS nulling to mitigate interference in the OBS S, total data throughput in the BSS and the OBSS can be increased in some situations. This increase in throughput improves transmission resource utilization in both the BSS and the OBSS. In addition, latency in the OBSS may be reduced (i.e., improved), as the OBSS can transmit data during the TxOP rather than waiting for the end of the TxOP and then attempting to win a next TxOP to transmit the data.

Introduction to Wireless Communications Networks

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. The techniques described herein may be utilized in any type of applied to Single Carrier (SC) and SC-Multiple Input Multiple Output (MIMO) systems.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Wireless Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Example Wireless Communications System

FIG. 1 is a diagram illustrating an example wireless communication system 100 with access points and wireless stations. For simplicity, only one access point 110 is shown in FIG. 1. An access point is generally a fixed station that communicates with the wireless stations and may also be referred to as a base station or some other terminology. A wireless station may be fixed or mobile and may also be referred to as a mobile station, a wireless device, or some other terminology. Access point 110 may communicate with one or more wireless stations 120 at any given moment on the downlink and uplink. The downlink (i.e., forward link) is the communication link from the access point to the wireless stations, and the uplink (i.e., reverse link) is the communication link from the wireless stations to the access point. A wireless station may also communicate peer-to-peer with another wireless station, for example, via direct link such as a tunneled direct link setup (TDLS). A system controller 130 may be in communication with and provide coordination and control for the access points.

While portions of the following disclosure will describe wireless stations 120 capable of communicating via Spatial Division Multiple Access (SDMA), for certain aspects, the wireless stations 120 may also include some wireless stations that do not support SDMA. Thus, for such aspects, an access point (AP) 110 may be configured to communicate with both SDMA and non-SDMA wireless stations. This approach may conveniently allow older versions of wireless stations ("legacy" stations) to remain deployed in an enterprise, extending their useful lifetime, while allowing newer SDMA wireless stations to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected wireless stations 120 collectively represents the multiple-output for downlink transmissions and the multiple-input for uplink transmissions. For pure SDMA, it is desired to have $N_{ap} \geq K \geq 1$ if the data symbol streams for the K wireless stations are not multiplexed in code, frequency, or time by some means. K may be greater than $N_{ap}$ if the data symbol streams can be multiplexed using TDMA technique, different code channels with CDMA, disjoint sets of subbands with OFDM, and so on. Each selected wireless station transmits user-specific data to and/or receives user-specific data from the access point. In general, each selected wireless station may be equipped with one or multiple antennas (i.e., $N_{sta} \geq 1$). The K selected wireless stations can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each wireless station may be equipped with a single antenna or multiple antennas. The system 100 may also be a TDMA system if the wireless stations 120 share the same frequency channel by dividing transmission/reception into different time slots, each time slot being assigned to different wireless station 120.

Figure 2:
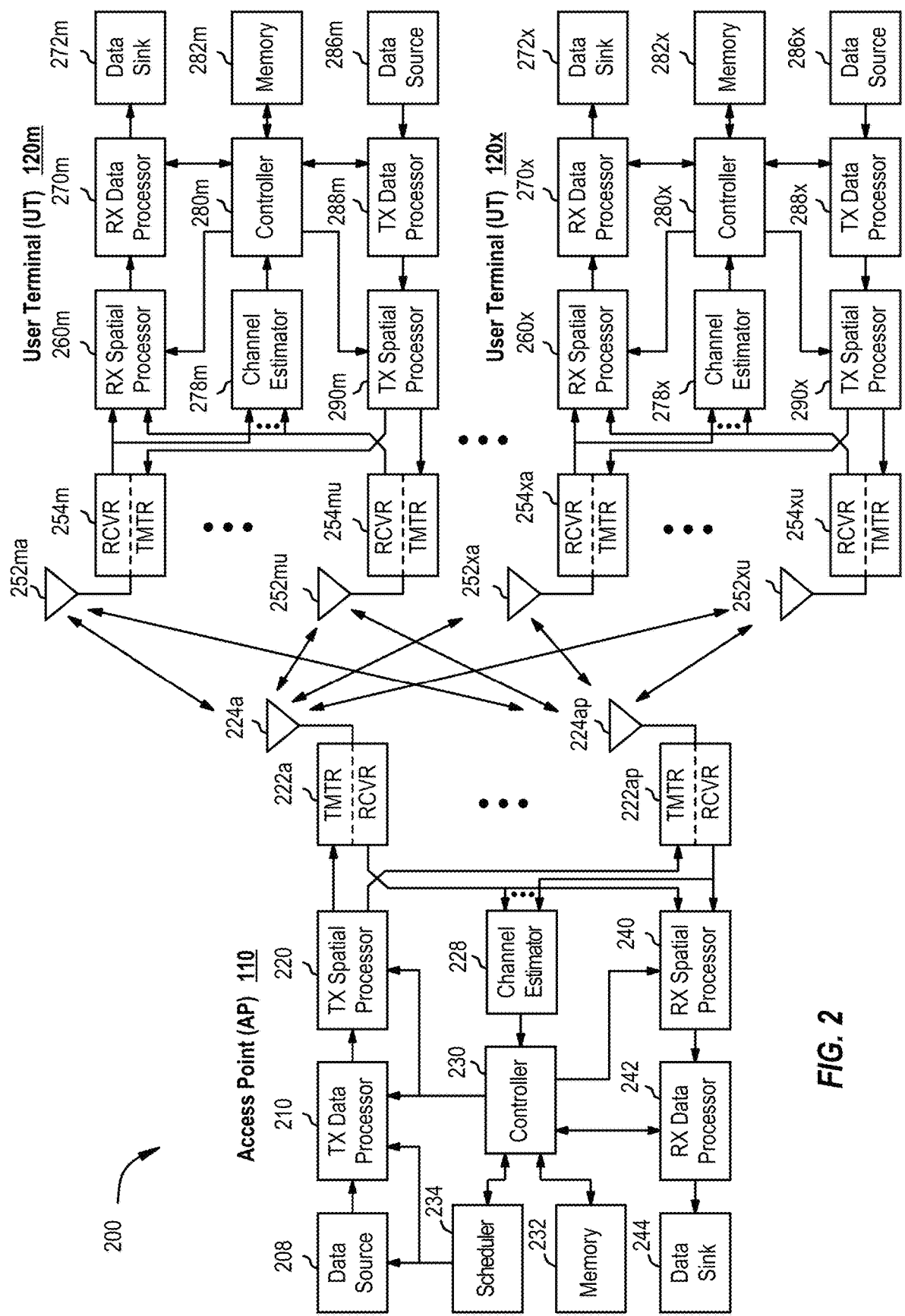
FIG. 2 is a block diagram conceptually illustrating a design of an example access point (AP) and wireless stations (STAs), in accordance with certain aspects of the present disclosure.

FIG. 2 illustrates a block diagram of access point 110 and two wireless stations 120m and 120x in a MIMO/MLO system 100. In certain aspects, the access point 110 and/or the wireless stations 120m and 120x may perform various techniques for handling direct link communications between wireless stations in MLO systems, for example, as further described herein with respect to FIGS. 4-20. For example, the access point 110 and/or the wireless stations 120m and 120x may include a respective link manager as described herein with respect to FIG. 1.

The access point 110 is equipped with $N_{ap}$ antennas 224a through 224t. Wireless station 120m is equipped with $N_{sta,m}$ antennas 252ma through 252mu, and wireless station 120x is equipped with $N_{sta,x}$ antennas 252xa through 252xu. The access point 110 is a transmitting entity for the downlink and a receiving entity for the uplink. Each wireless station 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. The term communication generally refers to transmitting, receiving, or both. In the following description, the subscript "DL" denotes the downlink, the subscript "UL" denotes the uplink, $N_{UL}$ wireless stations are selected for simultaneous transmission on the uplink, $N_{DL}$ wireless stations are selected for simultaneous transmission on the downlink, $N_{UL}$ may or may not be equal to $N_{DL}$, and $N_{UL}$ and $N_{DL}$ may be static values or can change for each scheduling interval. The beam-steering or some other spatial processing technique may be used at the access point and wireless station.

On the uplink, at each wireless station 120 selected for uplink transmission, a TX data processor 288 receives traffic data from a data source 286 and control data from a controller 280. TX data processor 288 processes (e.g., encodes, interleaves, and modulates) the traffic data for the wireless station based on the coding and modulation schemes associated with the rate selected for the wireless station and provides a data symbol stream. A TX spatial processor 290 performs spatial processing on the data symbol stream and provides $N_{sta,m}$ transmit symbol streams for the $N_{sta,m}$ antennas. Each transceiver (TMTR) 254 receives and processes (e.g., converts to analog, amplifies, filters, and frequency upconverts) a respective transmit symbol stream to generate an uplink signal. $N_{sta,m}$ transceivers 254 provide $N_{sta,m}$ uplink signals for transmission from $N_{sta,m}$ antennas 252 to the access point.

$N_{UL}$ wireless stations may be scheduled for simultaneous transmission on the uplink. Each of these wireless stations performs spatial processing on its data symbol stream and transmits its set of transmit symbol streams on the uplink to the access point.

At access point 110, $N_{ap}$ antennas 224a through 224ap receive the uplink signals from all $N_{UL}$ wireless stations transmitting on the uplink. Each antenna 224 provides a received signal to a respective transceiver (RCVR) 222. Each transceiver 222 performs processing complementary to that performed by transceiver 254 and provides a received symbol stream. An RX spatial processor 240 performs receiver spatial processing on the $N_{ap}$ received symbol streams from $N_{ap}$ transceiver 222 and provides $N_{UL}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective wireless station. An RX data processor 242 processes (e.g., demodulates, deinterleaves, and decodes) each recovered uplink data symbol stream in accordance with the rate used for that stream to obtain decoded data. The decoded data for each wireless station may be provided to a data sink 244 for storage and/or a controller 230 for further processing.

On the downlink, at access point 110, a TX data processor 210 receives traffic data from a data source 208 for $N_{DL}$ wireless stations scheduled for downlink transmission, control data from a controller 230, and possibly other data from a scheduler 234. The various types of data may be sent on different transport channels. TX data processor 210 processes (e.g., encodes, interleaves, and modulates) the traffic data for each wireless station based on the rate selected for that wireless station. TX data processor 210 provides $N_{DL}$ downlink data symbol streams for the $N_{DL}$ wireless stations. A TX spatial processor 220 performs spatial processing (such as a precoding or beamforming, as described in the present disclosure) on the $N_{DL}$ downlink data symbol streams, and provides $N_{ap}$ transmit symbol streams for the $N_{ap}$ antennas. Each transceiver 222 receives and processes a respective transmit symbol stream to generate a downlink signal. $N_{ap}$ transceivers 222 providing $N_{ap}$ downlink signals for transmission from $N_{ap}$ antennas 224 to the wireless stations.

At each wireless station 120, $N_{sta,m}$ antennas 252 receive the $N_{ap}$ downlink signals from access point 110. Each transceiver 254 processes a received signal from an associated antenna 252 and provides a received symbol stream. An RX spatial processor 260 performs receiver spatial processing on $N_{sta,m}$ received symbol streams from $N_{sta,m}$ transceiver 254 and provides a recovered downlink data symbol stream for the wireless station. The receiver spatial processing is performed in accordance with the CCMI, MMSE or some other technique. An RX data processor 270 processes (e.g., demodulates, deinterleaves and decodes) the recovered downlink data symbol stream to obtain decoded data for the wireless station.

At each wireless station 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each wireless station typically derives the spatial filter matrix for the wireless station based on the downlink channel response matrix $H_{dn,m}$ for that wireless station. Controller 230 derives the spatial filter matrix for the access point based on the effective uplink channel response matrix $H_{up,eff}$. Controller 280 for each wireless station may send feedback information (e.g., the downlink and/or uplink eigenvectors, eigenvalues, SNR estimates, and so on) to the access point. Controllers 230 and 280 also control the operation of various processing units at access point 110 and wireless station 120, respectively.

In certain wireless communication networks (e.g., 802.11be networks), a multi-link device (MLD) may be a wireless communication device with multiple affiliated APs or STAs. The MLD may have a single medium access control (MAC) service access point (SAP) to a logical link control (LLC) layer. The MLD may also have a MAC address that uniquely identifies the MLD management entity. An MLD may support various multi-link operations (MLO). In aspects, MLO may include multi-band aggregation, where two or more channels at different bands (e.g., 2.4, 5, and 6 GHz bands) are combined to achieve higher transmission rates. In aspects, the 6 GHz band may include a frequency range of 5.925-7.125 GHz. For example, a single frame may be split and transmitted simultaneously through the different channels at the different bands, reducing the frames transmission time or facilitating transmission of larger aggregated frames. MLO may include multi-band and multi-channel full duplex communications, which is achieved through transmitting and receiving on different channels (in the same or different bands) at the same time. MLO may include data and control plane separation on to different channels (in the same or different bands). In certain aspects, MLO may be implemented with a multi-link single radio (MLSR) architecture, where the multiple affiliated APs or STAs of an MLD may be logical devices under a single radio.

In typical wireless communications systems utilizing spatial reuse of transmission resources, multiple access points (APs) may cooperate in transmitting beamformed signals to stations (STAs). In joint transmission (TX), multiple APs coordinate their transmissions to transmit a signal to a STA. In coordinated beamforming (CBF), simultaneous transmission is allowed across neighboring APs. The APs employ physical layer (PHY) nulling techniques to mitigate interference to neighboring basic service set (BSS) transmissions caused by their own transmissions. In typical CBF techniques, operations may be considered "symmetric," wherein both BSS and overlapping basic service set (OBSS) devices (e.g., APs) null-out interference caused in their neighboring BSS. The process of nulling-out the interference reduces the total power that a device may use for transmitting a desired signal. In addition, nulling-out the interference can use antennas of the device, reducing the number of streams of data the device can transmit.

It is therefore desirable to develop techniques enabling an OBSS to share a TxOP without the TxOP-winning BSS nulling to mitigate interference in the OBSS.

Example Asymmetric Coordinated Beamforming

Aspects of the present disclosure, provide techniques enabling an OBSS to share a TxOP without the TxOP-winning BSS nulling to mitigate interference in the OBSS.

The present disclosure describe techniques for "coordinated beamforming" (CBF), where simultaneous transmission is allowed across neighboring APs subject to devices employing PHY nulling techniques to mitigate interference to neighboring BSS transmissions.

Typical CBF techniques focus on "symmetric" scenarios where both BSS and OBSS devices null-out interference to their neighboring BSS.

Aspects of the present disclosure provide techniques for asymmetric CBF, wherein the TxOP-winning BSS does not use nulling to mitigate interference to an OBSS; however, the OBSS creates a null towards the BSS in order to share the TxOP.

Figure 3:
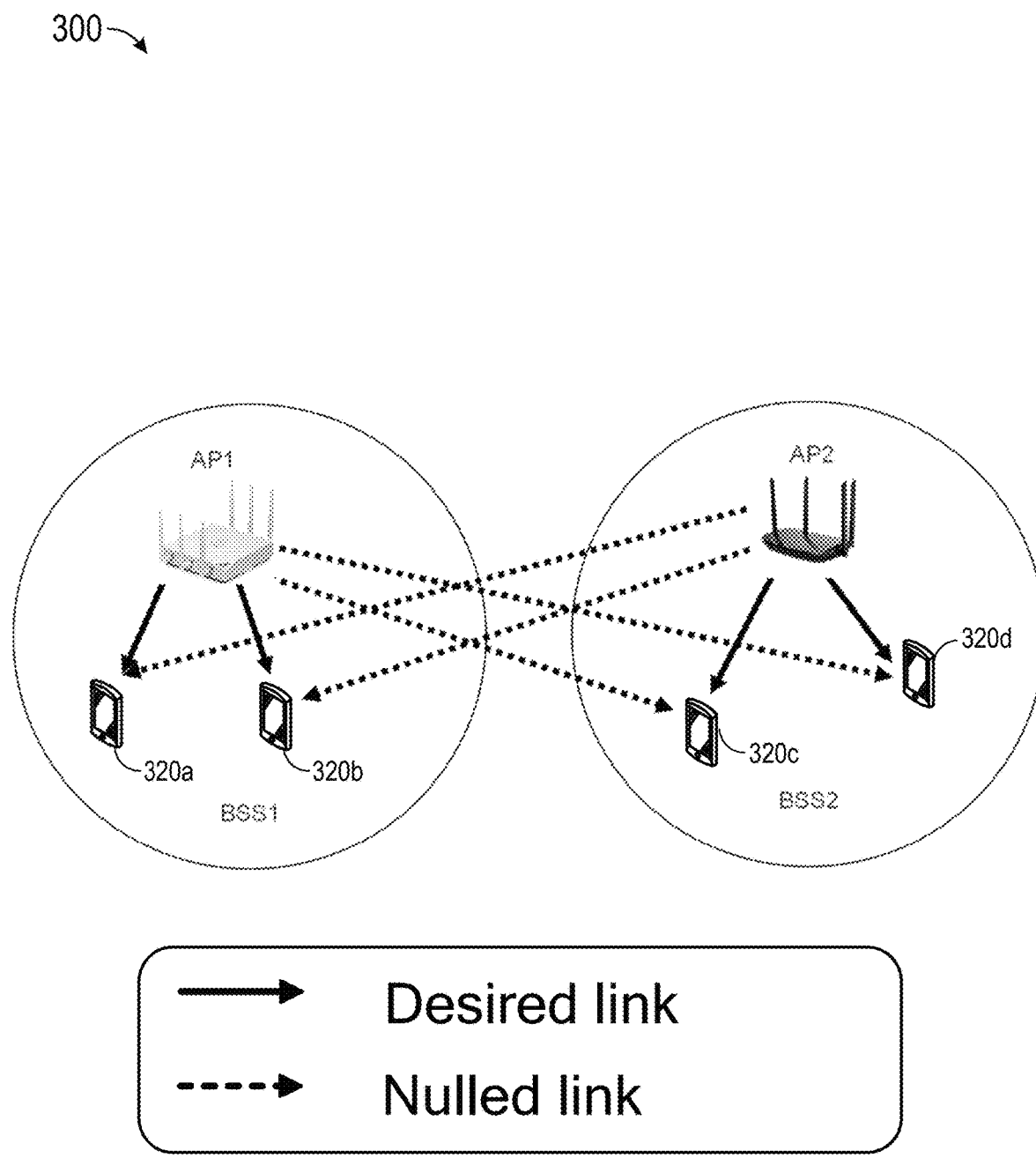
FIG. 3 depicts symmetric coordinated beamforming, in accordance with certain aspects of the present disclosure.

FIG. 3 depicts symmetric coordinated beamforming, according to aspects of the present disclosure. Thus, as illustrated AP1 in BSS1 transmits to STAs 320a and 320b while forming nulls toward BSS2 (e.g., toward the STAs 320c and 320d, which are in BSS2). Similarly, AP2 in BSS2 transmits simultaneously to STAs 320c and 320d while forming nulls toward BSS1 (e.g., toward the STAs 320a and 320b, which are in BSS1).

Figure 4:
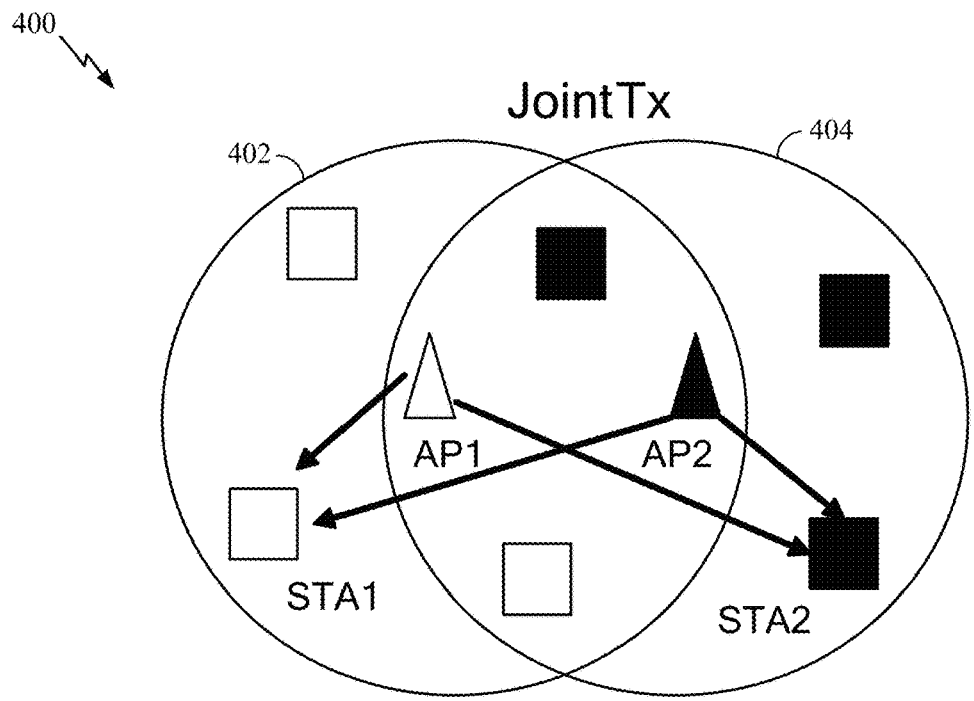
FIG. 4 depicts joint transmission and symmetric coordinated beamforming, according to aspects of the present disclosure.
Figure 4:
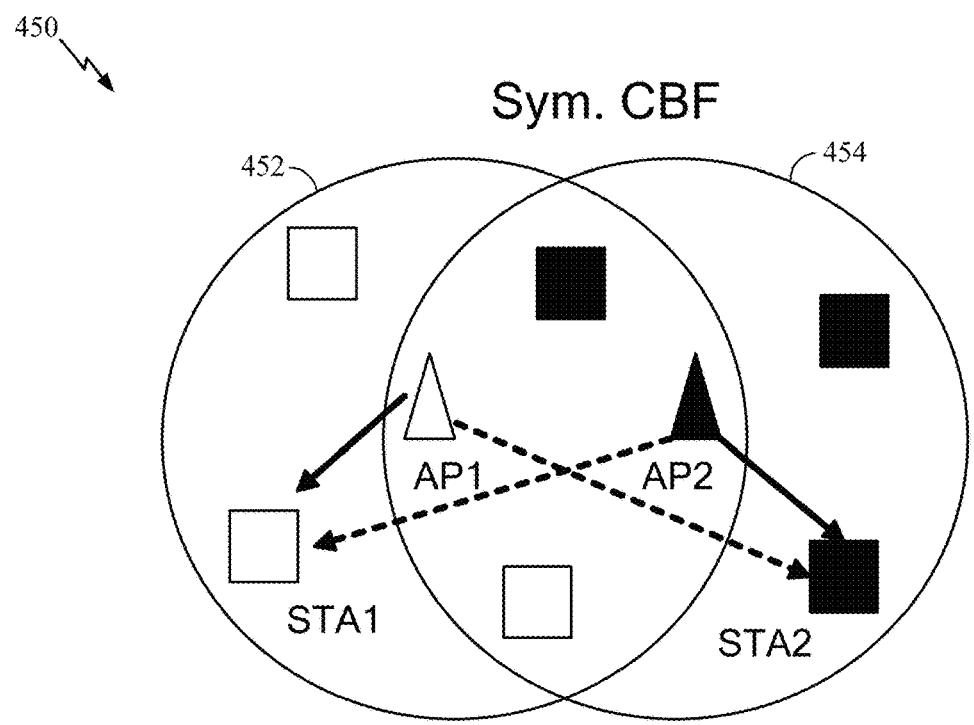

FIG. 4 depicts joint transmission and symmetric coordinated beamforming, according to aspects of the present disclosure. In joint transmission, multiple APs (AP1 and AP2) transmit simultaneously to a STA. Thus, as illustrated at 400, AP1 and AP2 transmit simultaneously to STA 1. AP1 and AP2 also are illustrated transmitting simultaneously to STA2. Advantages of joint transmission include high capacity, due to making use of all streams across all of the APs. Disadvantages of joint transmission include that the APs typically need to be tightly synchronized in time and frequency offset. In addition, the backhaul network connecting the APs must be a high-capacity network.

In symmetric coordinated beamforming, as shown at 450, each user receives data only from one AP. Thus, as illustrated, STA1 receives data from AP1, and STA2 receives data from AP2. Both APs create nulls to respective OBSS STAs. That is, AP1 creates a null toward STA2, and AP2 creates a null toward STA1. Advantages of coordinated beamforming over joint transmission include that the APs need not be as tightly synchronized, and further symmetric CBF can be used in situations wherein the backhaul network has less capacity. Disadvantages of symmetric coordinated beamforming, as compared to joint transmission, include having a lower data network throughput than joint transmission.

Figure 5:
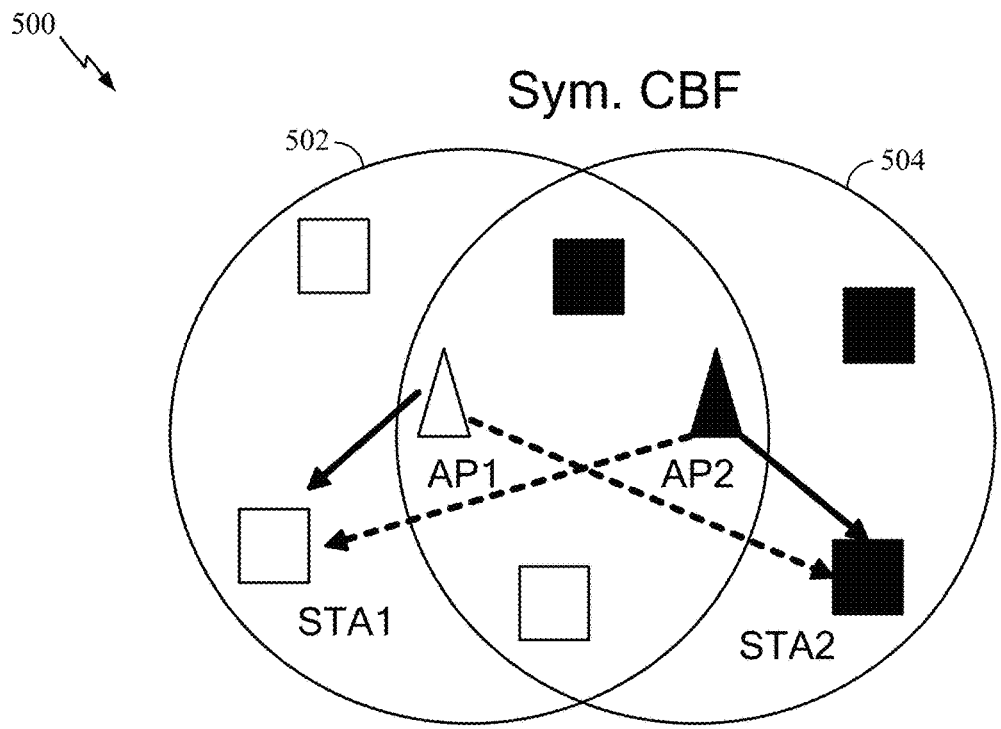
FIG. 5 depicts symmetric coordinated beamforming and asymmetric coordinated beamforming, in accordance with aspects of the present disclosure.
Figure 5:
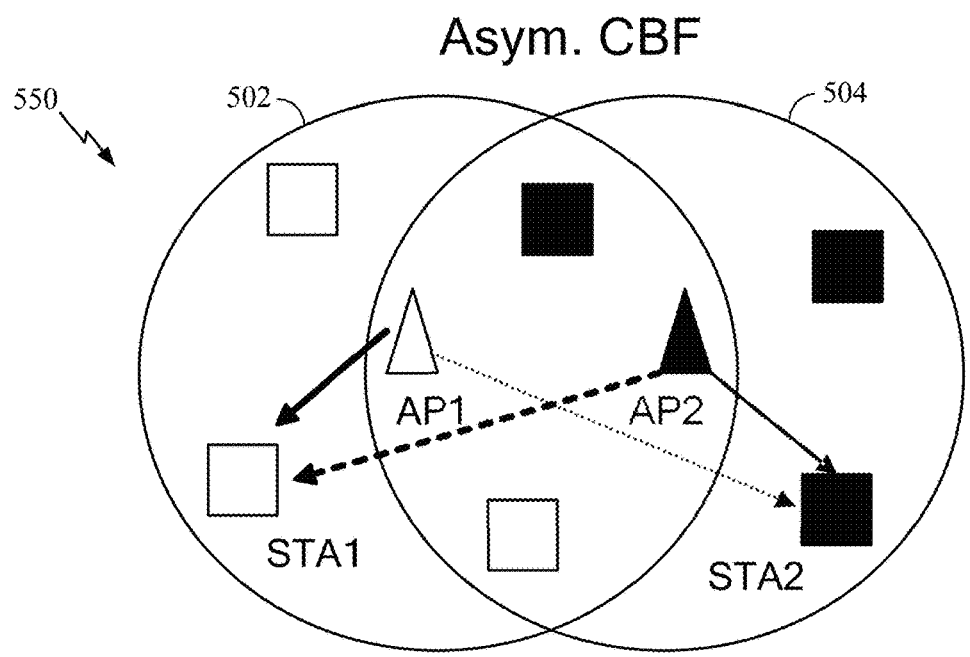
Figure 5:
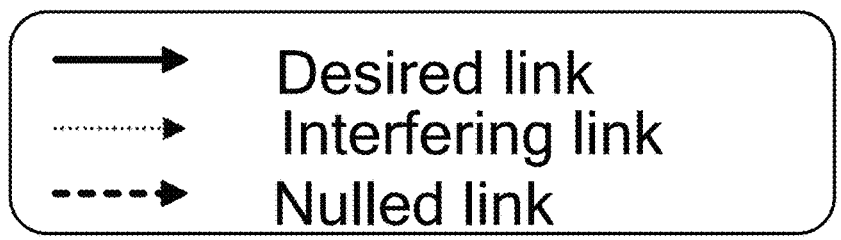

FIG. 5 depicts symmetric coordinated beamforming and asymmetric coordinated beamforming, in accordance with aspects of the present disclosure. As illustrated at 500, STA1 receives data from AP1, and STA2 receives data from AP2. Both APs create nulls to respective OBSS STAs. That is, AP1 creates a null toward STA2, and AP2 creates a null toward STA1.

In asymmetric coordinated beamforming, shown at 550, the TxOP-winning BSS (AP1) does not create any nulls, and is free to allocate all streams of the AP for data transmission. AP1 may create some interference to a neighboring OBSS. AP2, in the OBSS, is allowed to share the TxOP with AP1, if AP2 creates a null (e.g., through precoding or beamforming the transmission from AP2) towards STA(s) being scheduled in the TxOP-winning BSS, which is STA1, as illustrated.

Asymmetric CBF may have several advantages over symmetric CBF, as described herein.

An advantage of asymmetric CBF is that the TxOP-winning AP does not create nulls. When the TxOP-winning AP creates nulls, as in symmetric CBF, the creation of the nulls comes at the cost of reducing the number of streams allocated by the AP for data. Reducing the number of streams is not always desirable, and thus in asymmetric CBF, the TxOP-winning AP does not reduce the number of streams allocated for data in order to form nulls. If the TxOP-winning AP is transmitting all of the data available for transmission by the AP and unused streams are available, then the TxOP-winning AP can switch to using symmetric CBF. Thus, if it is possible for the TxOP-winning AP to allocate all streams in the TxOP-winning BSS, then asymmetric CBF may be preferable. For example, a BSS may resort to DL multi-user multiple-input multiple-output (MU-MIMO) transmissions, or a multi-stream single user (SU) transmission to a mesh AP.

In aspects of the present disclosure, asymmetric CBF can outperform symmetric CBF in high pathloss scenarios.

Asymmetric CBF can be a natural extension of spatial reuse (SR) techniques, in that there is no impact to the throughput of a TxOP-winning BSS, and an OBSS is free to share the TxOP as long as the OBSS nulls out interference to the BSS link.

In aspects of the present disclosure, there is less signaling overhead in asymmetric CBF than with symmetric CBF. Signaling overhead is reduced in asymmetric CBF because in symmetric CBF, both involved BSSes need to be informed of client(s) being scheduled in the other BSS during each TxOP, but in asymmetric CBF, the BSS does not need to know which client is being scheduled in the OBSS.

Figure 6:
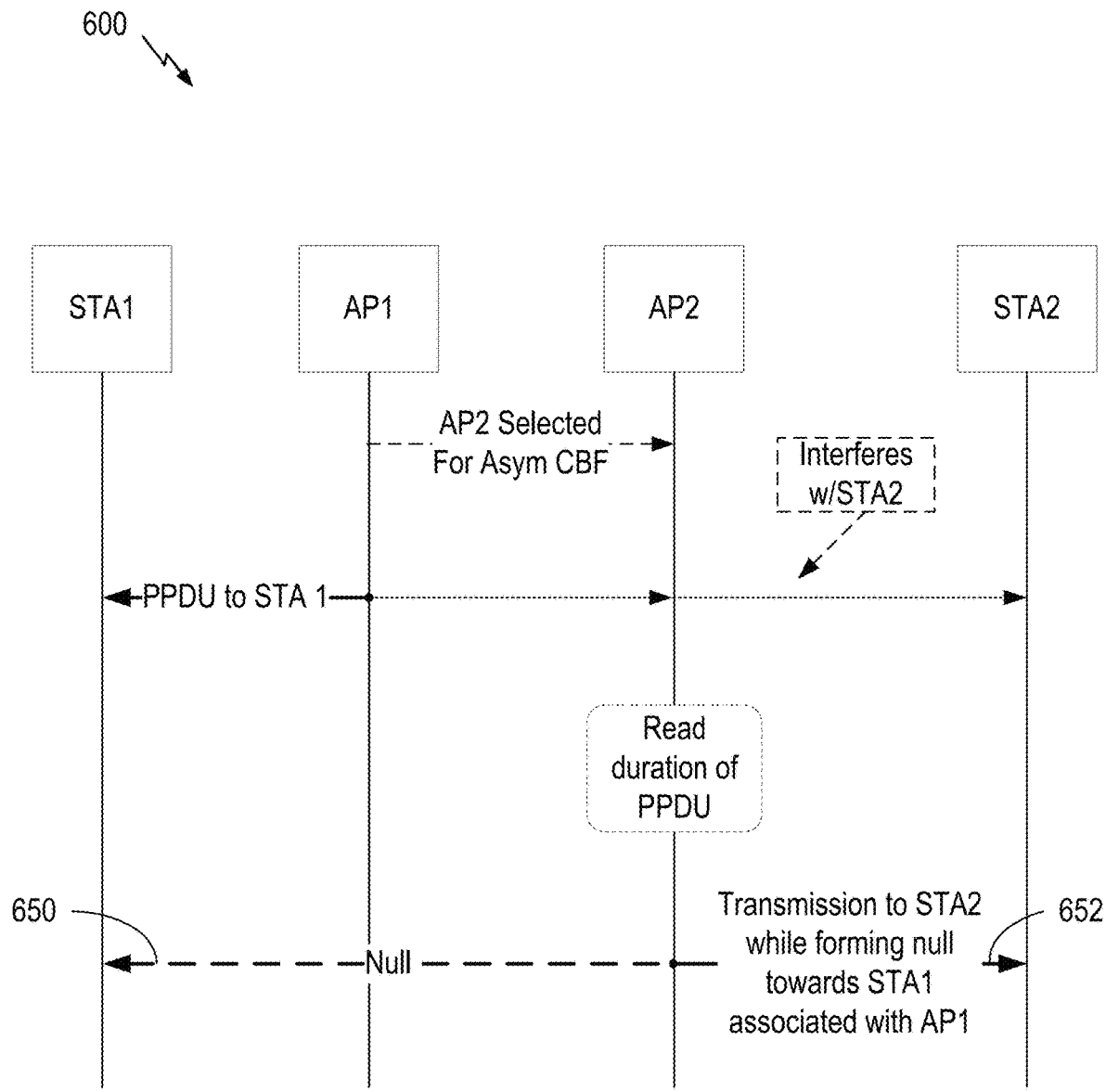
FIG. 6 depicts a call flow of two APs performing asymmetric coordinated beamforming with two STAs, in accordance with aspects of the present disclosure.

FIG. 6 depicts an example call flow of two APs performing asymmetric coordinated beamforming with two STAs, in accordance with aspects of the present disclosure. As illustrated, AP1 may transmit a signal to AP2 indicating to AP2 that AP2 is selected to participate in asymmetric CBF with AP1. In the example call flow, AP1 transmits a physical protocol data unit (PPDU) to STA1. As depicted, the transmission of the PPDU by AP1 to STA1 may cause interference to STA2. Optionally, AP2 may read a duration of the PPDU (e.g., by receiving and decoding a header of the PPDU) and determine a period for transmitting to STA2. AP2 then, during the duration of the transmission by AP1, transmits to STA2 while forming a null towards STA1 associated with AP1.

Figure 7:
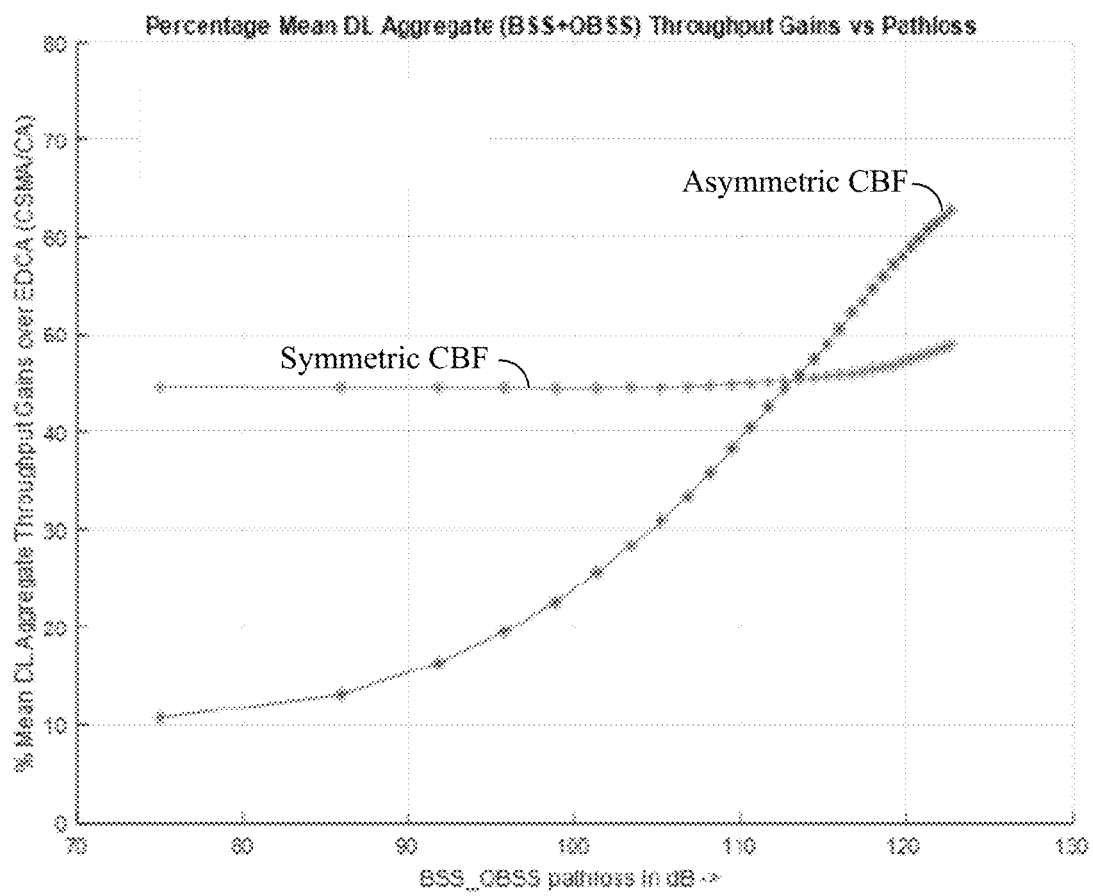
FIG. 7 depicts a graph comparing percentage network throughput gains of symmetric CBF and asymmetric CBF, in accordance with certain aspects of the present disclosure.

FIG. 7 depicts a graph showing percentage network throughput gains of symmetric CBF and asymmetric CBF over enhanced distributed channel access (EDCA, e.g., traditional CSMA/CA) for a simple topology having 1 BSS and 1 OBSS. The graph assumes a 2-stream AP with one active single antenna client STA per BSS or OBSS. The STA location(s) were picked uniformly randomly within each BSS. The graph also assumes full-buffer DL traffic. As illustrated, beyond a certain BSS_AP to OBSS_AP pathloss (e.g., 114 decibels (dB)), asymmetric CBF outperforms (e.g., has higher gains versus EDCA than) symmetric CBF.

Example Operations of Access Points

Figure 8:
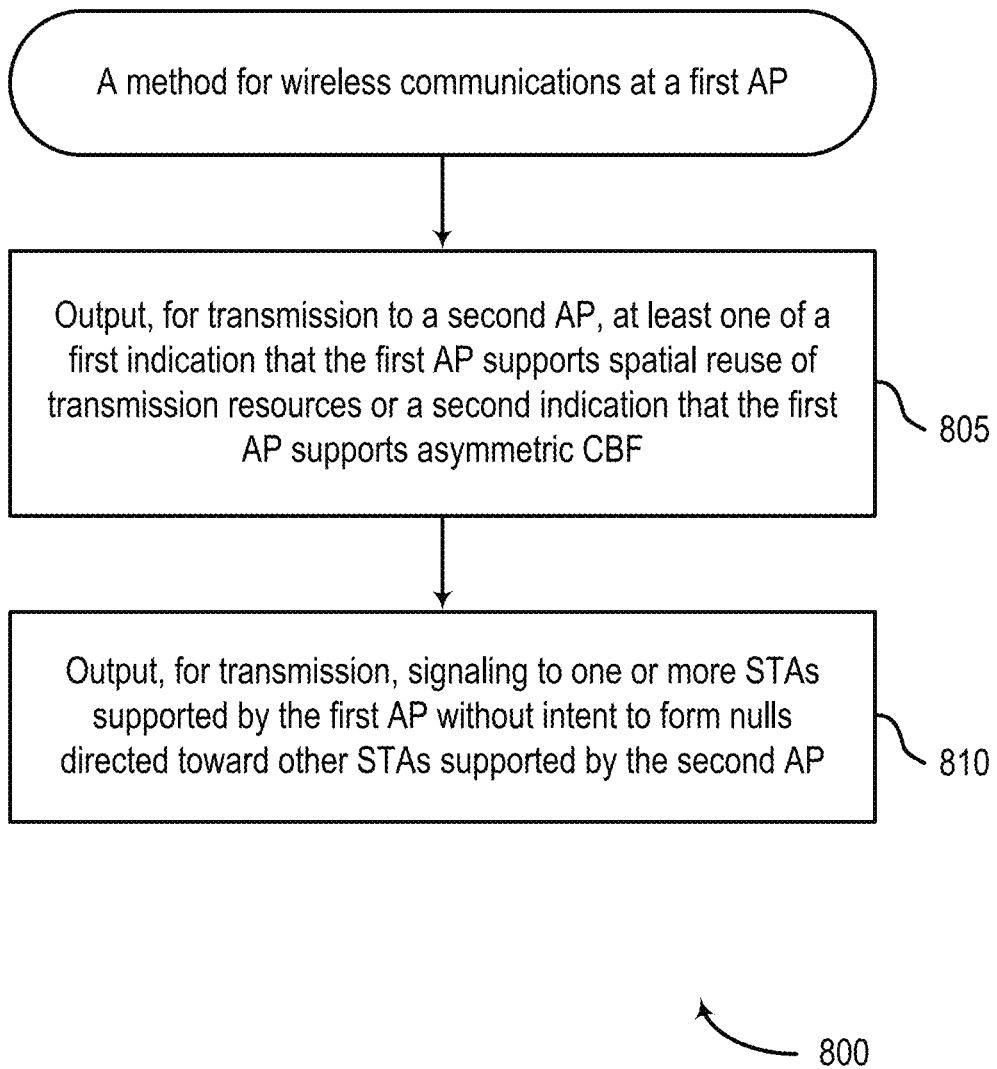
FIG. 8 depicts a flowchart illustrating an example method for wireless communication.

FIG. 8 shows an example of a method 800 for wireless communications at a first AP, such as an AP 110 of FIGS. 1 and 2.

Method 800 begins at step 805 with outputting, for transmission to a second AP, at least one of a first indication that the first AP supports spatial reuse of transmission resources or a second indication that the first AP supports asymmetric CBF. In some cases, the operations of this step refer to, or may be performed by, circuitry for outputting and/or code for outputting as described with reference to FIG. 10.

Method 800 then proceeds to step 810 with outputting, for transmission, signaling to one or more STAs supported by the first AP without intent to form nulls directed toward other STAs supported by the second AP. In some cases, the operations of this step refer to, or may be performed by, circuitry for outputting and/or code for outputting as described with reference to FIG. 10.

In some aspects, the method 800 further includes outputting, for transmission to the second AP, an indication that the first AP does not intend to perform symmetric CBF with the second AP. In some cases, the operations of this step refer to, or may be performed by, circuitry for outputting and/or code for outputting as described with reference to FIG. 10.

In some aspects, the method 800 further includes outputting, for transmission to the second AP, indications of each of the one or more STAs. In some cases, the operations of this step refer to, or may be performed by, circuitry for outputting and/or code for outputting as described with reference to FIG. 10.

In some aspects, the method 800 further includes determining, based on a CCA, a TxOP, wherein the at least one of the first indication or the second indication is output for transmission to the second AP after determining the TxOP and wherein the signaling is output for transmission during the TxOP. In some cases, the operations of this step refer to, or may be performed by, circuitry for determining and/or code for determining as described with reference to FIG. 10.

In some aspects, the method 800 further includes estimating a distance or pathloss to the second AP, wherein the at least one of the first indication or the second indication is output for transmission to the second AP based on a value of the distance or the pathloss being greater than a threshold value. In some cases, the operations of this step refer to, or may be performed by, circuitry for estimating and/or code for estimating as described with reference to FIG. 10.

In some aspects, the method 800 further includes outputting, for transmission to the second AP and zero or more other APs, an indication that the second AP is selected to participate in asymmetric CBF with the first AP. In some cases, the operations of this step refer to, or may be performed by, circuitry for outputting and/or code for outputting as described with reference to FIG. 10.

Figure 10:
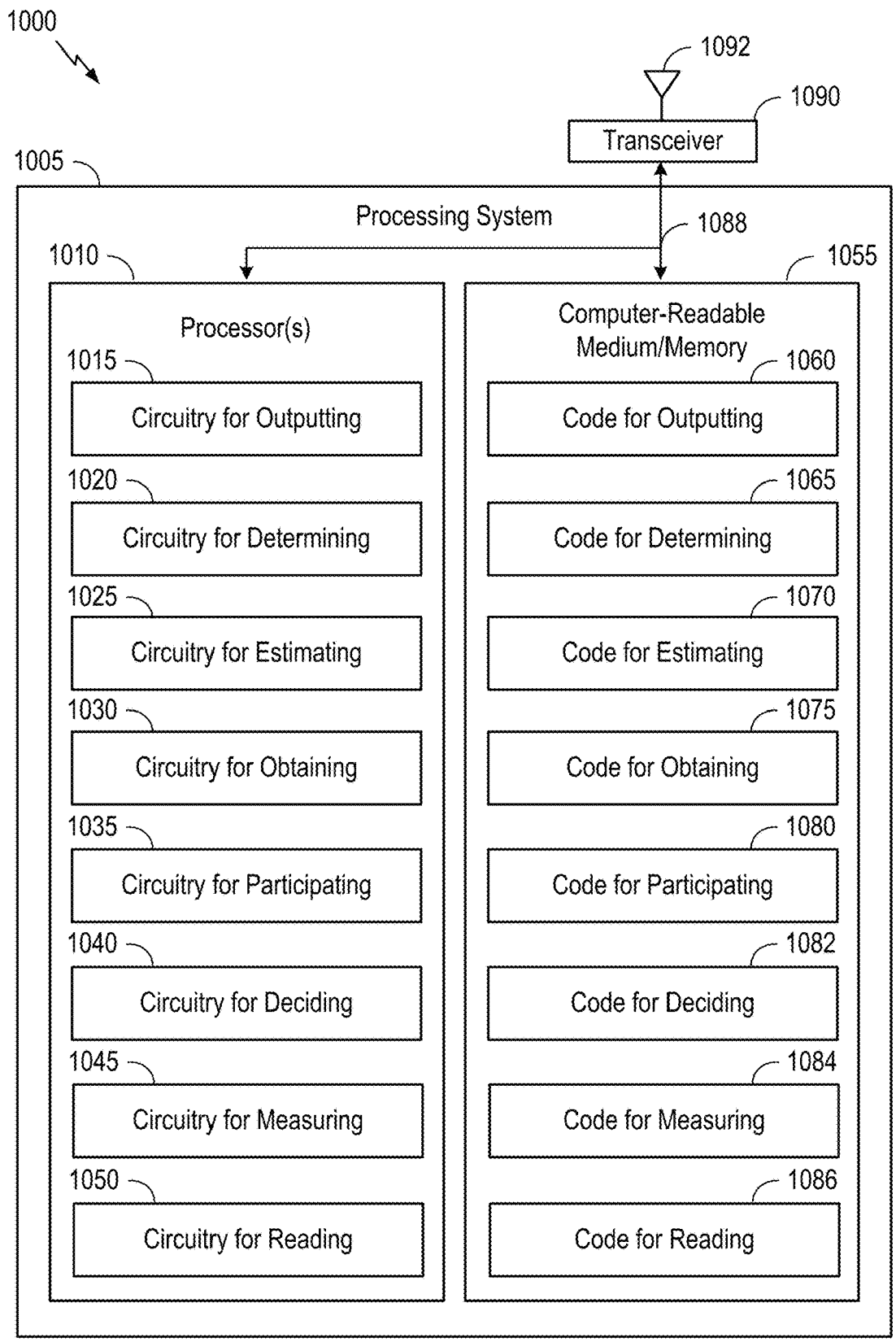
FIG. 10 depicts a block diagram of an example wireless communications device.

In one aspect, method 800, or any aspect related to it, may be performed by an apparatus, such as communications device 1000 of FIG. 10, which includes various components operable, configured, or adapted to perform the method 800. Communications device 1000 is described below in further detail.

Note that FIG. 8 is just one example of a method, and other methods including fewer, additional, or alternative steps are possible consistent with this disclosure.

Figure 9:
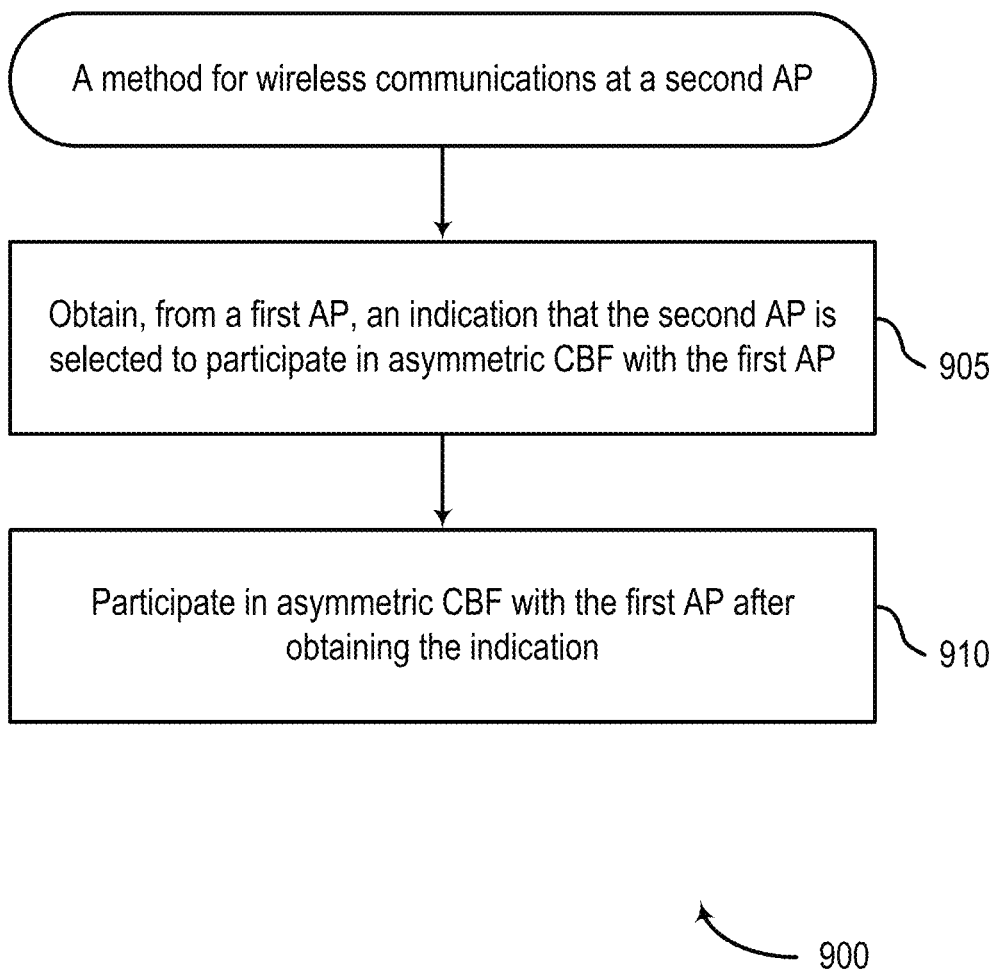
FIG. 9 depicts a flowchart illustrating an example method for wireless communication.

FIG. 9 shows an example of a method 900 for wireless communications at a second AP, such as an AP 110 of FIGS. 1 and 2.

Method 900 begins at step 905 with obtaining an indication, from a first AP, an indication that the second AP is selected to participate in asymmetric CBF with the first AP. In some cases, the operations of this step refer to, or may be performed by, circuitry for obtaining and/or code for obtaining as described with reference to FIG. 10.

Method 900 then proceeds to step 910 with participating in asymmetric CBF with the first AP after obtaining the indication. In some cases, the operations of this step refer to, or may be performed by, circuitry for participating and/or code for participating as described with reference to FIG. 10.

In some aspects, participating in asymmetric CBF with the first AP comprises outputting, for transmission, signaling to one or more second STAs supported by the second AP while forming one or more nulls directed toward one or more first STAs supported by the first AP.

In some aspects, the method 900 further includes deciding, based on one or more first CSI and one or more second CSIs, to schedule the signaling to the one or more second STAs, wherein the first CSIs are associated with one or more first channels between the second AP and the one or more first STAs and the one or more second CSIs are associated with one or more second channels between the second AP and the one or more second STAs. In some cases, the operations of this step refer to, or may be performed by, circuitry for deciding and/or code for deciding as described with reference to FIG. 10.

In some aspects, the method 900 further includes measuring the one or more first channels to generate first measurements. In some cases, the operations of this step refer to, or may be performed by, circuitry for measuring and/or code for measuring as described with reference to FIG. 10.

In some aspects, the method 900 further includes determining the one or more first CSIs based on the first measurements. In some cases, the operations of this step refer to, or may be performed by, circuitry for determining and/or code for determining as described with reference to FIG. 10.

In some aspects, the deciding is further based on a quantity of data available for transmission to the one or more second STAs.

In some aspects, the method 900 further includes reading a duration of a PPDU transmitted by the first AP, wherein the second AP outputs the signaling for transmission in a first period as short as or shorter than the duration. In some cases, the operations of this step refer to, or may be performed by, circuitry for reading and/or code for reading as described with reference to FIG. 10.

In some aspects, the first period is based on the duration and a second period for receiving an acknowledgment (ACK) of the signaling.

In one aspect, method 900, or any aspect related to it, may be performed by an apparatus, such as communications device 1000 of FIG. 10, which includes various components operable, configured, or adapted to perform the method 900. Communications device 1000 is described below in further detail.

Note that FIG. 9 is just one example of a method, and other methods including fewer, additional, or alternative steps are possible consistent with this disclosure.

Example Communications Device

FIG. 10 depicts aspects of an example communications device 1000. In some aspects, communications device 1000 is an AP, such as an AP 110 described above with respect to FIGS. 1 and 2.

The communications device 1000 includes a processing system 1005 coupled to the transceiver 1090 (e.g., a transmitter and/or a receiver). The transceiver 1090 is configured to transmit and receive signals for the communications device 1000 via the antenna 1092, such as the various signals as described herein. The transceiver 1090 may be an example of aspects of transceiver 222 described with reference to FIG. 2. The processing system 1005 may be configured to perform processing functions for the communications device 1000, including processing signals received and/or to be transmitted by the communications device 1000.

The processing system 1005 includes one or more processors 1010. In various aspects, the one or more processors 1010 may be representative of one or more of the RX data processor 242, the TX data processor 210, the TX spatial processor 220, or the controller 230 of AP 110 illustrated in FIG. 2. The one or more processors 1010 are coupled to a computer-readable medium/memory 1055 via a bus 1088. In certain aspects, the computer-readable medium/memory 1055 is configured to store instructions (e.g., computer-executable code) that when executed by the one or more processors 1010, cause the one or more processors 1010 to perform: the method 800 described with respect to FIG. 8, or any aspect related to it; and/or the method 900 described with respect to FIG. 9, or any aspect related to it. Note that reference to a processor performing a function of communications device 1000 may include one or more processors 1010 performing that function of communications device 1000.

In the depicted example, computer-readable medium/memory 1055 stores code (e.g., processor-executable instructions), such as code for outputting 1060, code for determining 1065, code for estimating 1070, code for obtaining 1075, code for participating 1080, code for deciding 1082, code for measuring 1084, and code for reading 1086. Processing of the code for outputting 1060, code for determining 1065, code for estimating 1070, code for obtaining 1075, code for participating 1080, code for deciding 1082, code for measuring 1084, and code for reading 1086 may cause the communications device 1000 to perform: the method 800 described with respect to FIG. 8, or any aspect related to it; and/or the method 900 described with respect to FIG. 9, or any aspect related to it.

The one or more processors 1010 include circuitry configured to implement (e.g., execute) the code stored in the computer-readable medium/memory 1055, including circuitry such as circuitry for outputting 1015, circuitry for determining 1020, circuitry for estimating 1025, circuitry for obtaining 1030, circuitry for participating 1035, circuitry for deciding 1040, circuitry for measuring 1045, and circuitry for reading 1050. Processing with circuitry for outputting 1015, circuitry for determining 1020, circuitry for estimating 1025, circuitry for obtaining 1030, circuitry for participating 1035, circuitry for deciding 1040, circuitry for measuring 1045, and circuitry for reading 1050 may cause the communications device 1000 to perform: the method 800 described with respect to FIG. 8, or any aspect related to it; and/or the method 900 described with respect to FIG. 9, or any aspect related to it.

Various components of the communications device 1000 may provide means for performing: the method 800 described with respect to FIG. 8, or any aspect related to it; and/or the method 900 described with respect to FIG. 9, or any aspect related to it. For example, means for transmitting, sending, or outputting for transmission may include the transmitter unit 222 or an antenna(s) 224 of AP 110 illustrated in FIG. 2 and/or the transceiver 1090 and the antenna 1092 of the communications device 1000 in FIG. 10. In some aspects, means for receiving or obtaining may include the receiver unit 222 or an antenna(s) 224 of AP 110 illustrated in FIG. 2 and/or the transceiver 1090 and the antenna 1092 of the communications device 1000 in FIG. 10.

Example Clauses

Implementation examples are described in the following numbered clauses:

Clause 1: A method for wireless communications at a first access point (AP), comprising: outputting, for transmission to a second AP, at least one of a first indication that the first AP supports spatial reuse of transmission resources or a second indication that the first AP supports asymmetric coordinated beamforming (CBF); and outputting, for transmission, signaling to one or more stations (STAs) supported by the first AP without intent to form nulls directed toward other STAs supported by the second AP.

Clause 2: The method of Clause 1, further comprising: outputting, for transmission to the second AP, an indication that the first AP does not intend to perform symmetric CBF with the second AP.

Clause 3: The method of any one of Clauses 1 and 2, further comprising: outputting, for transmission to the second AP, indications of each of the one or more STAs.

Clause 4: The method of any one of Clauses 1-3, further comprising: determining, based on a clear channel assessment (CCA), a transmission opportunity (TxOP), wherein the at least one of the first indication or the second indication is output for transmission to the second AP after determining the TxOP and wherein the signaling is output for transmission during the TxOP.

Clause 5: The method of any one of Clauses 1-4, further comprising: estimating a distance or pathloss to the second AP, wherein the at least one of the first indication or the second indication is output for transmission to the second AP based on a value of the distance or the pathloss being greater than a threshold value.

Clause 6: The method of any one of Clauses 1-5, further comprising: outputting, for transmission to the second AP and zero or more other APs, an indication that the second AP is selected to participate in asymmetric CBF with the first AP.

Clause 7: A method for wireless communications at a second AP, comprising: obtaining, from a first AP, an indication that the second AP is selected to participate in asymmetric CBF with the first AP; and participating in asymmetric CBF with the first AP after obtaining the indication.

Clause 8: The method of Clause 7, wherein participating in asymmetric CBF with the first AP comprises outputting, for transmission, signaling to one or more second STAs supported by the second AP while forming one or more nulls directed toward one or more first STAs supported by the first AP.

Clause 9: The method of Clause 8, further comprising: deciding, based on one or more first CSI and one or more second CSIs, to schedule the signaling to the one or more second STAs, wherein the first CSIs are associated with one or more first channels between the second AP and the one or more first STAs and the one or more second CSIs are associated with one or more second channels between the second AP and the one or more second STAs.

Clause 10: The method of Clause 9, further comprising: measuring the one or more first channels to generate first measurements; and determining the one or more first CSIs based on the first measurements.

Clause 11: The method of Clause 9, wherein the deciding is further based on a quantity of data available for transmission to the one or more second STAs.

Clause 12: The method of Clause 8, further comprising: reading a duration of a physical protocol data unit (PPDU) transmitted by the first AP, wherein the second AP outputs the signaling for transmission in a first period as short as or shorter than the duration.

Clause 13: The method of Clause 12, wherein the first period is based on the duration and a second period for receiving an acknowledgment (ACK) of the signaling.

Clause 14: An apparatus, comprising: a memory comprising processor-executable instructions; and a processor configured to execute the executable instructions and cause the apparatus to perform a method in accordance with any one of Clauses 1-13.

Clause 15: An apparatus, comprising means for performing a method in accordance with any one of Clauses 1-13.

Clause 16: A non-transitory computer-readable medium comprising executable instructions that, when executed by a processor of an apparatus, cause the apparatus to perform a method in accordance with any one of Clauses 1-13.

Clause 17: A computer program product embodied on a computer-readable storage medium comprising code for performing a method in accordance with any one of Clauses 1-13.

ADDITIONAL CONSIDERATIONS

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components.

Means for receiving may include a transceiver, a receiver or at least one antenna and at least one receive processor illustrated in FIG. 2. Means for transmitting, means for sending or means for outputting may include, a transceiver, a transmitter or at least one antenna and at least one transmit processor illustrated in FIG. 2. Means for communicating, means for generating, means for taking one or more actions, means for selecting, means for determining, means for ignoring, means for mapping and means for relaying may include a processing system, which may include one or more processors, such as processors 260m, 270m, 288m, and/or 290m of the STA 120m and/or processors 210, 220, 240, and/or 242 of the AP 110 shown in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as combinations that include multiples of one or more members (aa, aabb, aabbcc, bb, bbcc, and/or cc).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a wireless station 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a wireless station and/or access point as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a wireless station and/or access point can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for wireless communications at a first access point (AP), comprising:
   outputting, for transmission to a second AP, at least one of a first indication that the first AP supports spatial reuse of transmission resources or a second indication that the first AP supports asymmetric coordinated beamforming (CBF); and
   outputting, for transmission, signaling to one or more stations (STAs) supported by the first AP without intent to form nulls directed toward other STAs supported by the second AP.

2. The method of claim 1, further comprising:
   outputting, for transmission to the second AP, an indication that the first AP does not intend to perform symmetric CBF with the second AP.

3. The method of claim 1, further comprising:
   outputting, for transmission to the second AP, indications of each of the one or more STAs.

4. The method of claim 1, further comprising:
   determining, based on a clear channel assessment (CCA), a transmission opportunity (TxOP), wherein the at least one of the first indication or the second indication is output for transmission to the second AP after determining the TxOP and wherein the signaling is output for transmission during the TxOP.

5. The method of claim 1, further comprising:
   estimating a distance or pathloss to the second AP, wherein the at least one of the first indication or the second indication is output for transmission to the second AP based on a value of the distance or the pathloss being greater than a threshold value.

6. The method of claim 1, further comprising:
   outputting, for transmission to the second AP and zero or more other APs, an indication that the second AP is selected to participate in asymmetric CBF with the first AP.

7. A method for wireless communications at a second access point (AP), comprising:
   obtaining, from a first AP, an indication that the second AP is selected to participate in asymmetric coordinated beamforming (CBF) with the first AP; and
   participating in asymmetric CBF with the first AP after obtaining the indication.

8. The method of claim 7, wherein participating in asymmetric CBF with the first AP comprises outputting, for transmission, signaling to one or more second stations (STAs) supported by the second AP while forming one or more nulls directed toward one or more first STAs supported by the first AP.

9. The method of claim 8, further comprising:
   deciding, based on one or more first channel state information (CSI) and one or more second CSIs, to schedule the signaling to the one or more second STAs, wherein the first CSIs are associated with one or more first channels between the second AP and the one or more first STAs and the one or more second CSIs are associated with one or more second channels between the second AP and the one or more second STAs.

10. The method of claim 9, further comprising:
    measuring the one or more first channels to generate first measurements; and
    determining the one or more first CSIs based on the first measurements.

11. The method of claim 9, wherein the deciding is further based on a quantity of data available for transmission to the one or more second STAs.

12. The method of claim 8, further comprising:
    reading a duration of a physical protocol data unit (PPDU) transmitted by the first AP, wherein the second AP outputs the signaling for transmission in a first period as short as or shorter than the duration.

13. The method of claim 12, wherein the first period is based on the duration and a second period for receiving an acknowledgment (ACK) of the signaling.

14. A first access point (AP) configured for wireless communication, comprising:
    a memory comprising processor-executable instructions; and
    one or more processors configured to execute the processor-executable instructions and cause the first AP to:
        output, for transmission to a second AP, at least one of a first indication that the first AP supports spatial reuse of transmission resources or a second indication that the first AP supports asymmetric coordinated beamforming (CBF); and
        output, for transmission, signaling to one or more stations (STAs) supported by the first AP without intent to form nulls directed toward other STAs supported by the second AP.

15. The first AP of claim 14, wherein the one or more processors are configured to execute the processor-executable instructions and further cause the first AP to:
    output, for transmission to the second AP, an indication that the first AP does not intend to perform symmetric CBF with the second AP.

16. The first AP of claim 14, wherein the one or more processors are configured to execute the processor-executable instructions and further cause the first AP to:
    output, for transmission to the second AP, indications of each of the one or more STAs.

17. The first AP of claim 14, wherein the one or more processors are configured to execute the processor-executable instructions and further cause the first AP to:
    determine, based on a clear channel assessment (CCA), a transmission opportunity (TxOP), wherein the at least one of the first indication or the second indication is output for transmission to the second AP after determining the TxOP and wherein the signaling is output for transmission during the TxOP.

18. The first AP of claim 14, wherein the one or more processors are configured to execute the processor-executable instructions and further cause the first AP to:
    estimate a distance or pathloss to the second AP, wherein the at least one of the first indication or the second indication is output for transmission to the second AP based on a value of the distance or the pathloss being greater than a threshold value.

19. The first AP of claim 14, wherein the one or more processors are configured to execute the processor-executable instructions and further cause the first AP to:
    output, for transmission to the second AP and zero or more other APs, an indication that the second AP is selected to participate in asymmetric CBF with the first AP.

20. A second access point (AP) configured for wireless communication, comprising:
    a memory comprising processor-executable instructions; and
    one or more processors configured to execute the processor-executable instructions and cause the second AP to:

obtain, from a first AP, an indication that the second AP is selected to participate in asymmetric coordinated beamforming (CBF) with the first AP; and participate in asymmetric CBF with the first AP after obtaining the indication.

21. The second AP of claim 20, wherein the one or more processors being configured to execute the processor-executable instructions and cause the second AP to participate in asymmetric CBF with the first AP comprises the one or more processors being configured to:

output, for transmission, signaling to one or more second stations (STAs) supported by the second AP while forming one or more nulls directed toward one or more first STAs supported by the first AP.

22. The second AP of claim 21, wherein the one or more processors are configured to execute the processor-executable instructions and further cause the second AP to:

decide, based on one or more first channel state information (CSI) and one or more second CSIs, to schedule the signaling to the one or more second STAs, wherein the first CSIs are associated with one or more first channels between the second AP and the one or more first STAs and the one or more second CSIs are associated with one or more second channels between the second AP and the one or more second STAs.

23. The second AP of claim 22, wherein the one or more processors are configured to execute the processor-executable instructions and further cause the second AP to:

measure the one or more first channels to generate first measurements; and determine the one or more first CSIs based on the first measurements.

24. The second AP of claim 22, wherein the one or more processors are further configured to decide to schedule the signaling to the one or more second STAs based further on a quantity of data available for transmission to the one or more second STAs.

25. The second AP of claim 21, wherein the one or more processors are configured to execute the processor-executable instructions and further cause the second AP to:

read a duration of a physical protocol data unit (PPDU) transmitted by the first AP; and output the signaling for transmission in a first period as short as or shorter than the duration.

26. The second AP of claim 25, wherein the first period is based on the duration and a second period for receiving an acknowledgment (ACK) of the signaling.

* * * * *